(12) United States Patent
Yu

(10) Patent No.: US 9,831,673 B1
(45) Date of Patent: Nov. 28, 2017

(54) CONTROL DEVICE FOR POWER SUPPLY TIME OF TIMERS

(71) Applicant: Chao-Cheng Yu, Taoyuan (TW)

(72) Inventor: Chao-Cheng Yu, Taoyuan (TW)

( * ) Notice: Subject to any disclaimer, the term of this patent is extended or adjusted under 35 U.S.C. 154(b) by 0 days.

(21) Appl. No.: 15/331,514

(22) Filed: Oct. 21, 2016

(51) Int. Cl.
    *H02M 7/02* (2006.01)
    *H01H 47/00* (2006.01)
    *G04B 19/22* (2006.01)
    *H02J 3/00* (2006.01)

(52) U.S. Cl.
    CPC .............. *H02J 3/00* (2013.01); *H01H 47/00* (2013.01)

(58) Field of Classification Search
    CPC . H02M 7/02; H02J 3/00; H01H 47/00; G04B 19/22
    See application file for complete search history.

(56) References Cited

U.S. PATENT DOCUMENTS

| | | | | |
|---|---|---|---|---|
| 6,243,626 B1 * | 6/2001 | Schanin | ...................... | G07F 9/02 700/286 |
| 2014/0103742 A1 * | 4/2014 | Bello | ........................ | H02J 3/00 307/140 |
| 2014/0320020 A1 * | 10/2014 | Shirai | ...................... | H04B 3/54 315/149 |
| 2015/0130351 A1 * | 5/2015 | Braunstein | ......... | H05B 37/0227 315/86 |

* cited by examiner

*Primary Examiner* — Rexford Barnie
*Assistant Examiner* — Terrence Willoughby
(74) *Attorney, Agent, or Firm* — WPAT, P.C., Intellectual Property Attorneys; Anthony King

(57) ABSTRACT

A control device for power supply time of timers comprises an alternative current (AC) power source input module, a direct current (DC) power source supply module, an AC power source output module electrically connected to a load end, a relay, a central control module, a relay driver circuit, a day/night detecting module, a power supply time backward display light set, a power supply time forward display light set, a power supply time backward selection control button and a power supply time forward selection control button. Herein, by pressing the power supply time backward selection control button or the power supply time forward selection control button, one of the power supply time backward display lights or the power supply time forward display lights can be turned on such that the central control module can, based on the sunset time of the previous day as well as the configured power supply backward setting time or power supply forward setting time, postpone or advance the power supply time for the load end in the next day, and then record the sunset time of the next day so as to control the power supply time for the load end in the further next day.

10 Claims, 12 Drawing Sheets

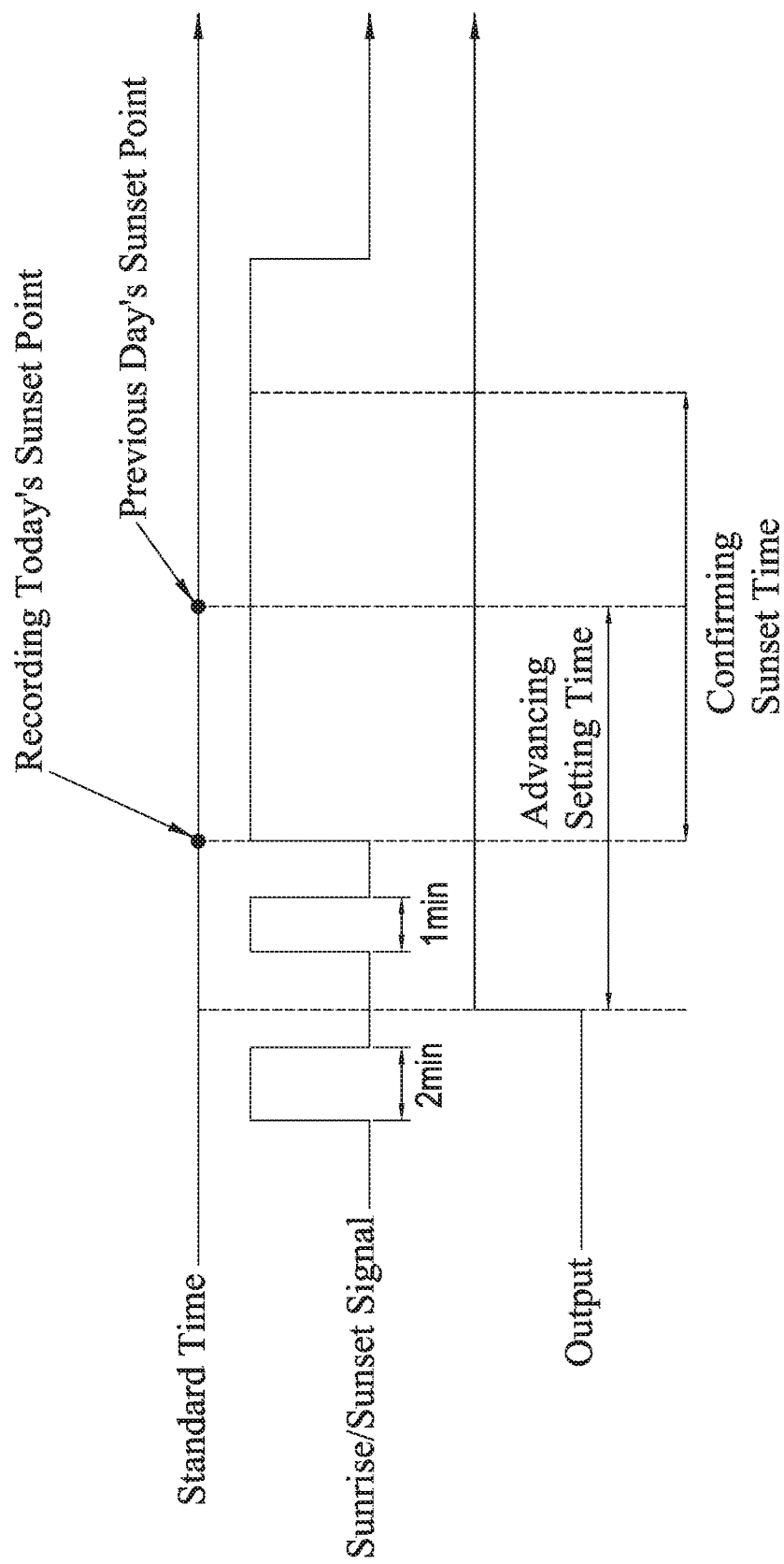

CONTROL DEVICE FOR POWER SUPPLY TIME OF TIMERS

BACKGROUND OF THE INVENTION

1. Field of the Invention

The present invention generally relates to a control device for power supply time of timers; in particular, it relates to a control device for power supply time capable of forwardly configuring the power supply time of the next day based on the sunset time of the previous day.

2. Description of Related Art

It is well-known that most of the electric power socket devices enabling the timing feature may be equipped with a timer which can be a type of mechanical countdown timer; taking this sort of timer including a wheel disc as an example, a user may need to rotate the wheel disc installed on the timer so as to set up the countdown duration of time to control the power supply time of the electric power socket device thereby saving the power consumption of the electric devices plugged into the electric power socket device.

However, this type of mechanical countdown timers may be simple and direct, the number of wheel disc rotations just represents the extent of the intended power supply time, so it can not be configured to operate for longer power supply time; besides, since the available power supply time that the mechanical countdown timer can be rotated to may be limited, users actually don't have quite many choices for the desired length of power supply time.

Moreover, because the mechanical countdown timers are unable to display the currently remaining power supply time, the user can not precisely appreciate the currently remaining power supply time but simply has to rely on the user's memory to roughly estimate it, thus very likely leading to inefficient power supply on demand. Moreover, seeing that power supply conditions in different environments may vary; hence, suppose the power supply processes are manipulated in accordance with time, it is quite possible to encounter annoying issues such as activating power supply too early before sunset or deactivating power supply too late after sunset because of various daylight saving times in different locations, thus the prior art mechanical countdown timers currently available in the market still have significant space for improvements.

Therefore, it would be an optimal solution if it is possible to devise a kind of control device for power supply time of timers which allows to forwardly set up the power supply time of the next day based on the sunset time of the previous day in order to resolve the above-said undesirable issues of activating power supply before sunset or deactivating power supply after sunset.

SUMMARY OF THE INVENTION

A control device for power supply time of timers is disclosed, which is electrically connected to a power grid end and at least a load end, wherein the control device for power supply time of timers comprises: an alternative current (AC) power source input module, used to input AC power; a direct current (DC) power source supply module, which is electrically connected to the AC power source input module and used to convert the AC power into the DC power; an AC power source output module, which is electrically connected to a load end in order to output the AC power to the load end; a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end; a central control module, which is electrically connected to the DC power source supply module in order to control the integral operation mechanism of the control device for power supply time of timers; a day/night detecting module, which is electrically connected to the central control module for detecting the sunrise and sunset conditions and transferring the signal indicating the sunrise and sunset conditions of each day to the central control module thereby allowing the central control module to determine and record the sunrise time and sunset time of each day; a relay driver circuit, which is electrically connected to the central control module and the relay, in which the central control module is able to connect to the relay by means of the relay driver circuit such that electric power can be supplied to the AC power source output module; a power supply time backward display light set, which includes at least one power supply time backward display light and is electrically connected to the central control module, wherein each of the power supply time backward display lights represents a power supply time backward setting time, and the light-on or light-off in any more than one power supply time backward display lights represents the status change in the control of the central control module; a power supply time forward display light set, which includes at least one power supply time forward display light and is electrically connected to the central control module, wherein each of the power supply time forward display lights represents a power supply time forward setting time, and the light-on or light-off in any more than one power supply time forward display lights represents the status change in the control of the central control module; a power supply time backward selection control button, which is electrically connected to the central control module, wherein the power supply time backward selection control button can be pressed to select power supply backward setting time, and, by pressing the power supply time backward selection control button, the power supply time backward display light can be turn on or off; a power supply time forward selection control button, which is electrically connected to the central control module, wherein the power supply time forward selection control button can be pressed to select the power supply forward setting time, and, by pressing the power supply time forward selection control button, the power supply time forward display light can be turn on or off; and, by pressing the power supply time backward selection control button or the power supply time forward selection control button, it turns on one of the power supply time backward display lights or the power supply time forward display lights such that the central control module can, based on the sunset time of the previous day as well as the configured power supply backward setting time or power supply forward setting time, postpone or advance the power supply time for the load end in the next day, and then record the sunset time of the next day so as to control the power supply time for the load end in the further next day.

In a preferred embodiment, further comprising the light-on in a power supply time backward display light to represent that the power supply time is endless.

In a preferred embodiment, further comprising the light-on in a power supply time backward display light to represent the power supply time of the next day is the sunset time of the previous day and to stop power supply at the sunrise time of the previous day.

In a preferred embodiment, further comprising the light-offs in all of the power supply time backward display lights to represent not postponing power supply.

In a preferred embodiment, the power supply time backward display light can represent the postponed power supply time as being 1 hour, 2 hours, 4 hours or 8 hours.

In a preferred embodiment, further comprising the light-offs in all of the power supply time forward display lights to represent not advancing power supply.

In a preferred embodiment, the power supply time forward display light can represent the advanced power supply time as being 30 minutes, 60 minutes, 90 minutes or 120 minutes.

In a preferred embodiment, further comprising a reset circuit electrically connected to the central control module, in which the reset circuit is, upon repowering, used to provide the central control module with the reset signal.

In a preferred embodiment, after the day/night detecting module determines the sunrise condition of the next day and the central control module determines and records the sunrise time of the next day, then only after the sunrise time of the next day can the day/night detecting module start to determine and the central control module record the sunset time of the next day.

In a preferred embodiment, the day/night detecting module includes at least an optical sensor.

BRIEF DESCRIPTION OF THE DRAWINGS

FIG. 6C shows a determination diagram in the second embodiment of the control device for power supply time of timers according to the present invention.

DETAILED DESCRIPTION OF THE PREFERRED EMBODIMENTS

Figure 1:
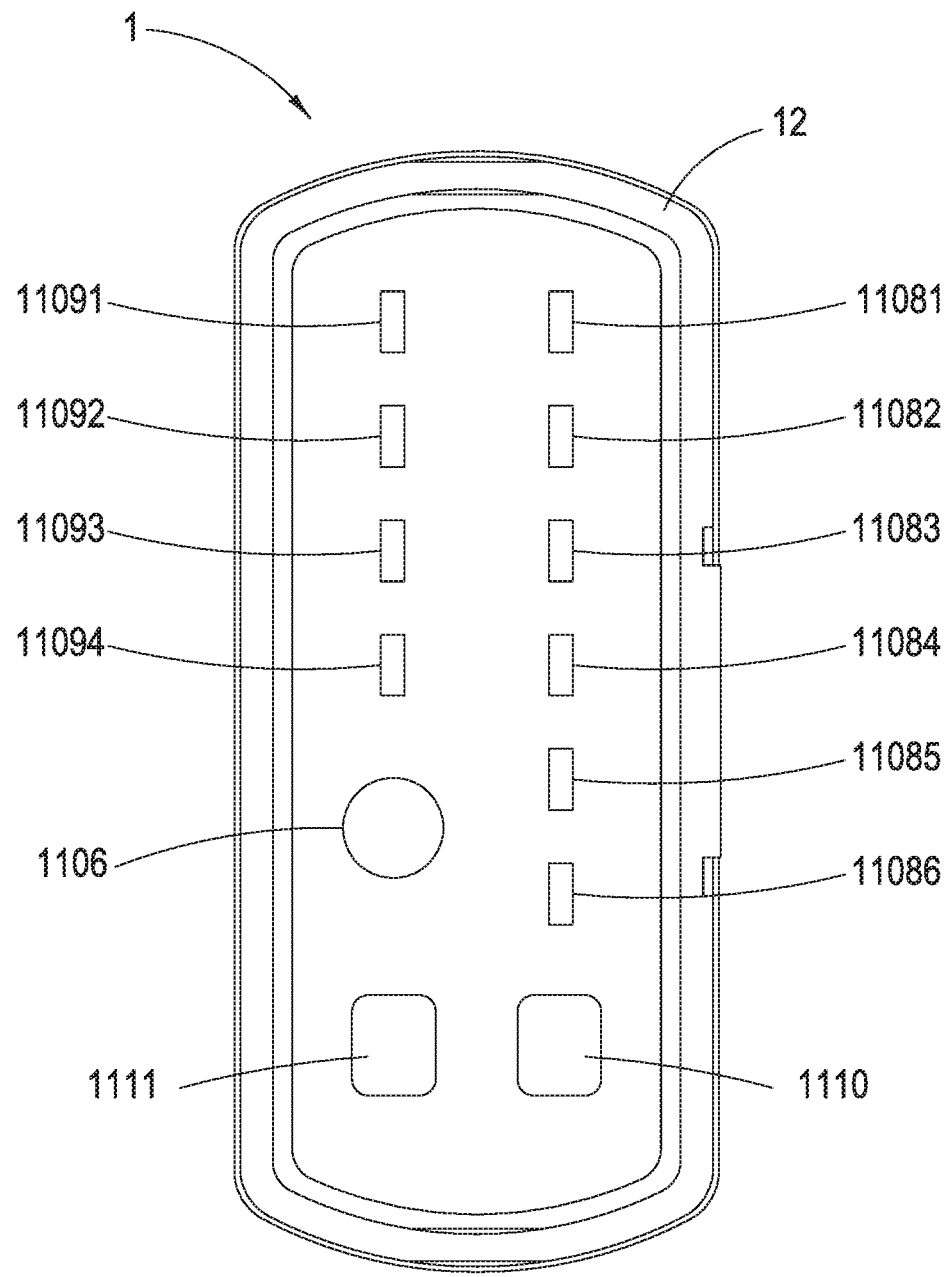
FIG. 1 shows a structure view of the control device for power supply time of timers according to the present invention.
Figure 2:
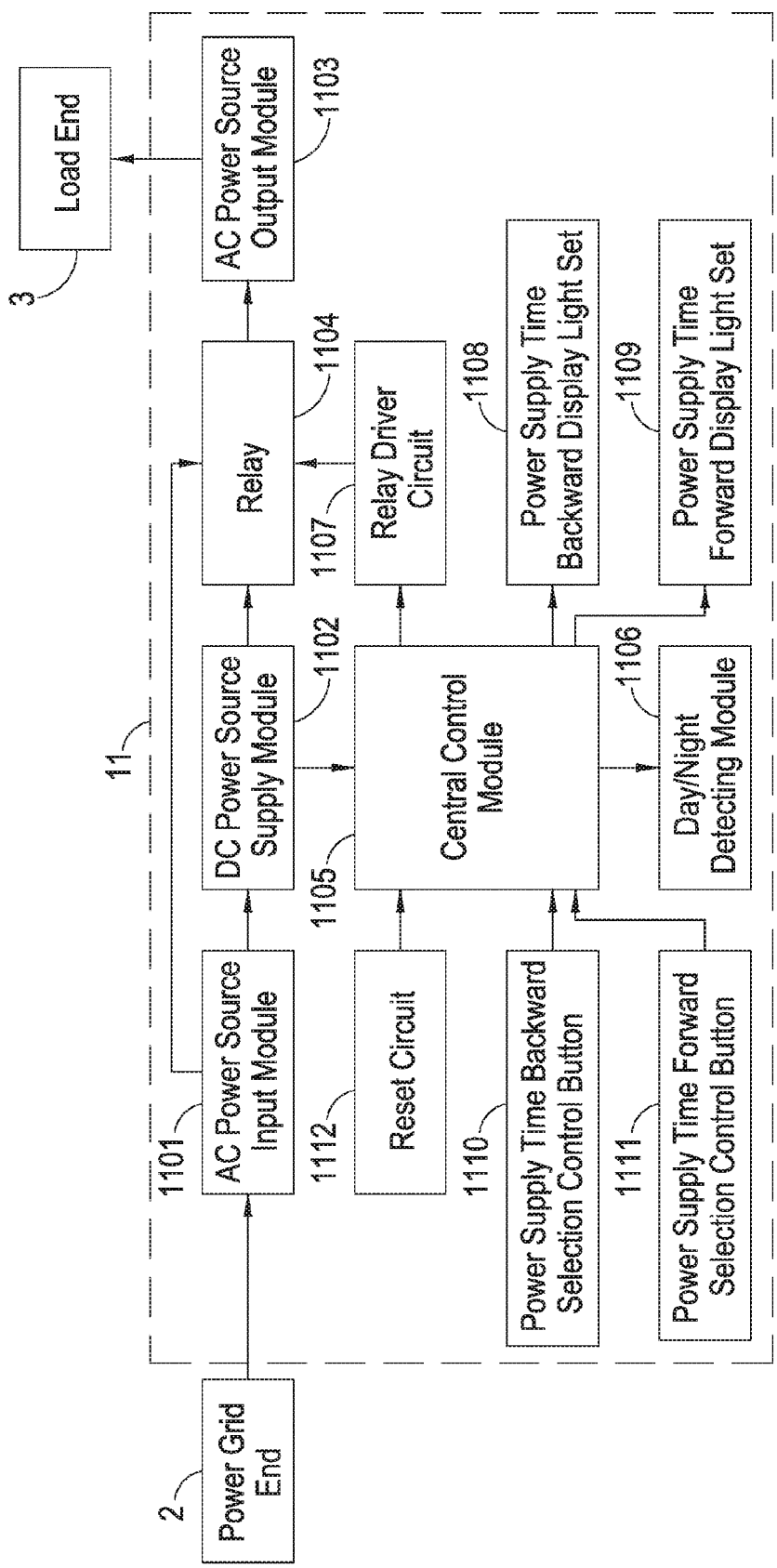
FIG. 2 shows an integral structure view of the control device for power supply time of timers according to the present invention.

Other technical contents, aspects and effects in relation to the present invention can be clearly appreciated through the detailed descriptions concerning the preferred embodiments of the present invention in conjunction with the appended drawings.

Refer initially to FIGS. 1-4, wherein a structure view, an integral structure view, a structure view of the power supply time backward display light set and a structure view of the power supply time forward display light set in the control device for power supply time of timers according to the present invention are respectively shown. It can appreciated from such figures that the control device for power supply time of timers 1 is electrically connected between a power grid end 2 and a load end 3, wherein the control device for power supply time of timers 1 comprises a housing 12 and an electric circuit board 11, and the electric circuit board 11 is installed within the housing 12 and includes an alternative current (AC) power source input module 1101, a direct current (DC) power source supply module 1102, an AC power source output module 1103, a relay 1104, a central control module 1105, a day/night detecting module 1106, a relay driver circuit 1107, a power supply time backward display light set 1108, a power supply time forward display light set 1109, a power supply time backward selection control button 1110, a power supply time forward selection control button 1111 and a reset circuit 1112.

Figure 5A:
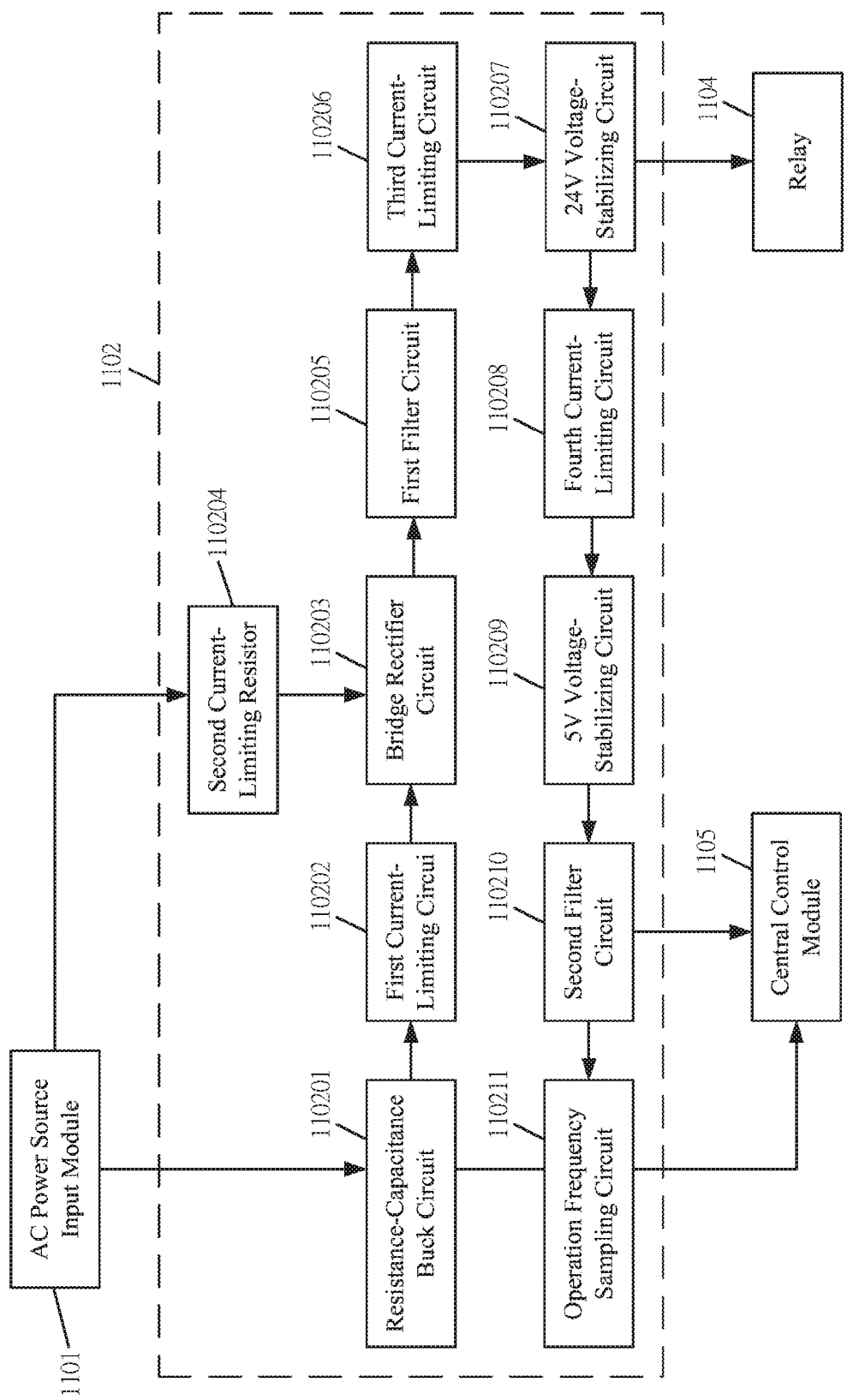
FIG. 5A shows a structure view of the DC power source supply module in the control device for power supply time of timers according to the present invention.
Figure 5B:
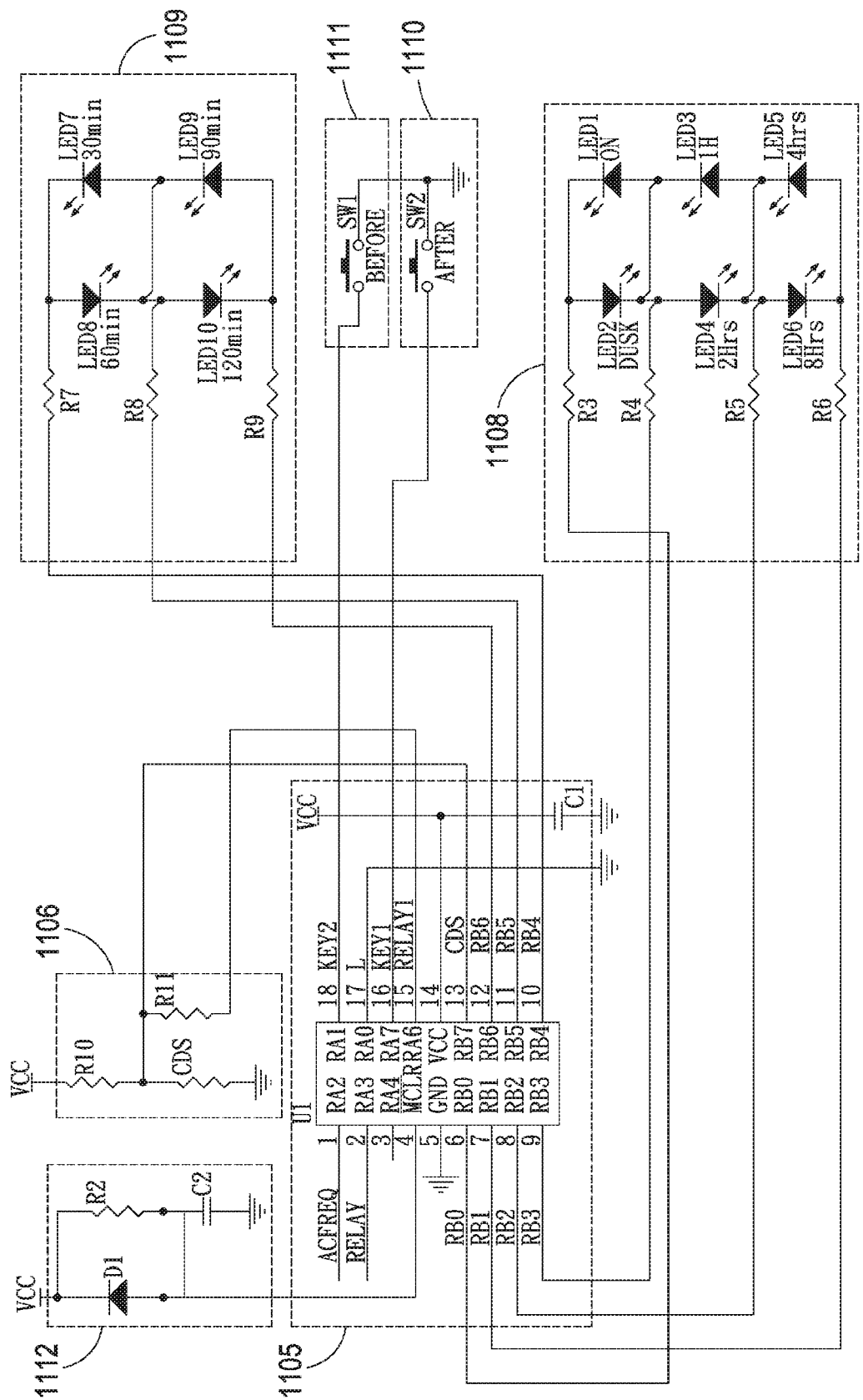
FIG. 5B shows a partial circuit structure view of the control device for power supply time of timers according to the present invention.
Figure 5C:
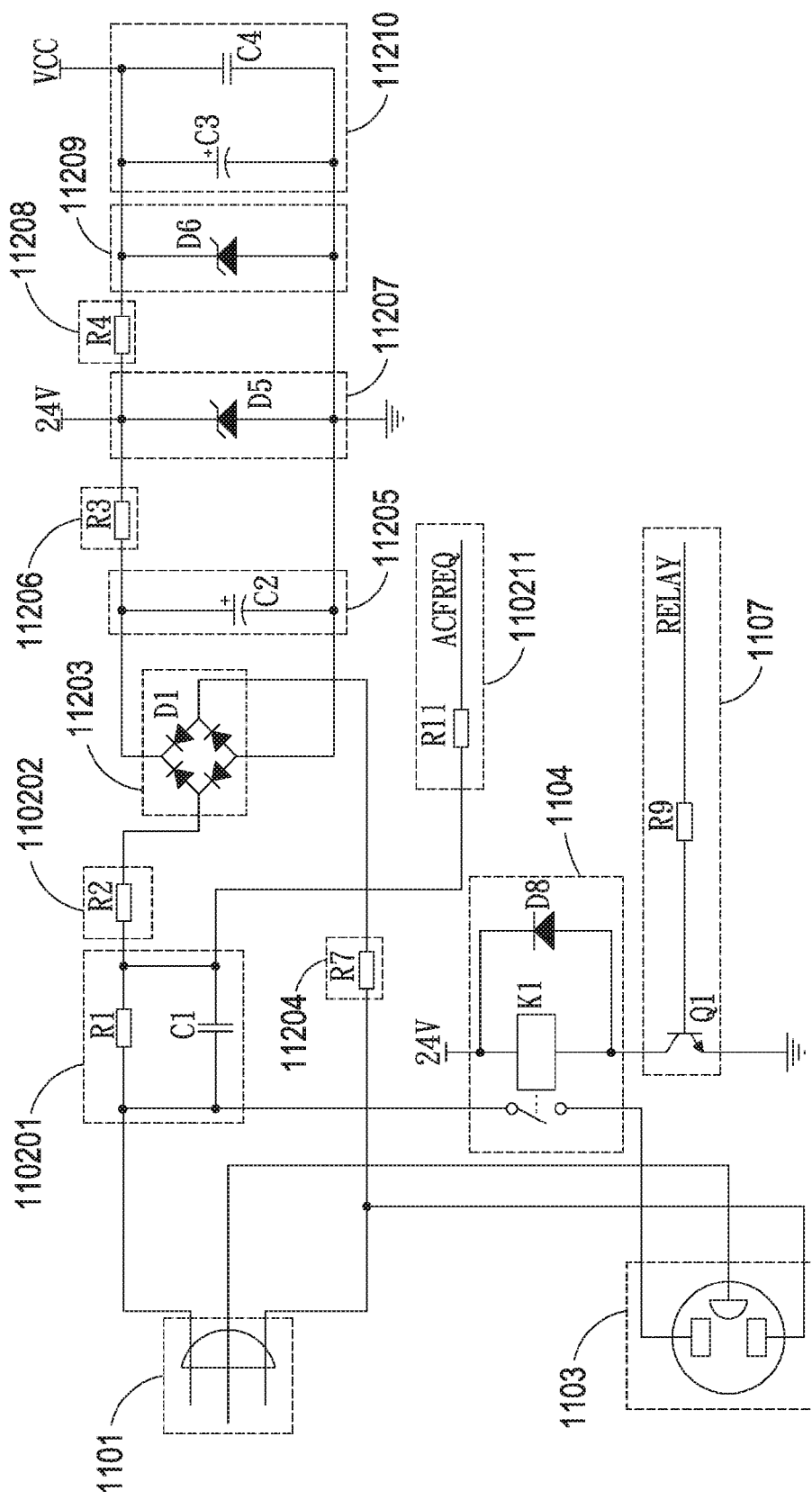
FIG. 5C shows a partial circuit structure view of the control device for power supply time of timers according to the present invention.

Herein the AC power source input module 1101 can operate to input AC electric power, and the DC power source supply module 1102 is electrically connected to the AC power source input module 1101 and operates to convert AC power into DC power. As shown in FIGS. 5A-5C, the DC power source supply module 1102 includes a resistance-capacitance buck circuit 110201, a first current-limiting circuit 110202, a bridge rectifier circuit 110203, a second current-limiting circuit 110204, a first filter circuit 110205, a third current-limiting circuit 110206, a 24V voltage-stabilizing circuit 110207, a fourth current-limiting circuit 110208, a 5V voltage-stabilizing circuit 110209, a second filter circuit 110210 and an operation frequency sampling circuit 110211.

Also, herein the resistance-capacitance buck circuit 110201 is applied to limit the maximal operation current by means of the capacitive reactance generated by the capacitor under a fixed AC signal frequency, and the bridge rectifier circuit 110203 can be electrically connected to the resistance-capacitance buck circuit 110201 via the first current-limiting circuit 110202 thereby rectifying the AC power source coming from the AC power source input module 1101 into the pulsed DC power source. Moreover, the second current-limiting circuit 110204 can be further installed between the AC power source input module and the bridge rectifier circuit.

The rectified pulsed DC power inputted by the bridge rectifier circuit can be transformed into stable DC power by means of the first filter circuit 110205. Next, through the 24V voltage-stabilizing circuit 110207 electrically connected between the third current-limiting circuit 110206 and the first filter circuit 110205, it is possible to voltage stabilize the DC power inputted by the first filter circuit 110205 to a voltage of 24V thereby supplying electric power to the relay 1104 for operations.

Subsequently, with the 5V voltage-stabilizing circuit 110209 electrically connected to the 24V voltage-stabilizing circuit via the fourth current-limiting circuit 110208, it is possible to voltage stabilize the DC power inputted by the 24V voltage-stabilizing circuit 110207 to the voltage of 5V. Then, with the second filter circuit 110210, it is possible to stabilize the DC power outputted by the 5V voltage-stabilizing output circuit 110209 so as to provide stable DC power to the central control module 1105 for operations. In addition, the operation frequency sampling circuit 110211 connected between the resistance-capacitance buck circuit 110201 and the central control module 1105 is capable of taking the AC signals from the electric power grid end 2 to act as the operation counts for the central control module 115.

Besides, the AC power source output module 1103 is electrically connected to the load end 3 in order to output the AC power to the load end 3. Moreover, the relay 1104 is electrically connected to the AC power source input module 1101, the DC power source supply module 1102 and the AC power source output module 1103, wherein the relay 1104 is used to control whether the AC power inputted by the AC power source input module 1103 should pass through the relay 1104 to supply the power to the AC power source output module 1103 such that the AC power source output module 1103 can output AC power to the load end 3.

In addition, the central control module 1105 is electrically connected to the DC power source supply module 1102 in order to control the integral operation mechanism of the control device for power supply time of timers 1. Meanwhile, the day/night detecting module 1106 includes at least an optical detector such that it can be employed to detect and determine sunrise and sunset conditions and transfer the signal indicating the detected sunrise and sunset condition to the central control module 1105 for storage, and then the central control module 1105 determines and records the sunrise time and the sunset time of each day. Also, the central control module 1105 can further drive the relay 1104 to conduct by way of the relay driver circuit 1107 so as to provide electric power to the AC power source output module 1103.

Additionally, after the day/night detecting module 1106 determines the sunrise condition of the next day and the central control module 1105 determines and records the sunrise time of the next day, then only after the sunrise time of the next day can the day/night detecting module 1106 start to determine and the central control module 1105 record the sunset time of the next day.

Figure 3:
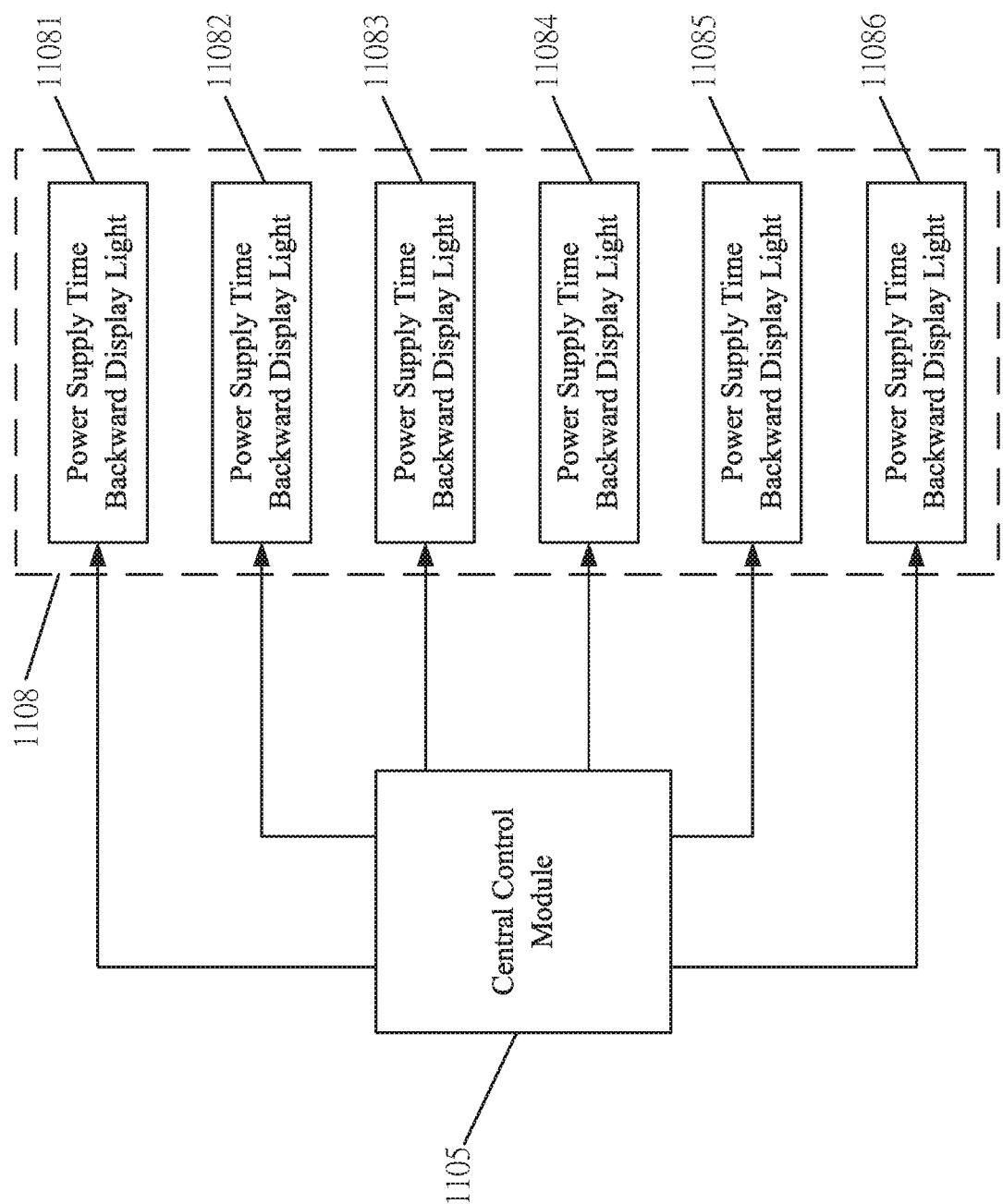
FIG. 3 shows a structure view of the power supply time backward display light set in the control device for power supply time of timers according to the present invention.

The power supply time backward display light set 1108 is electrically connected to the central control module 1105, as shown in FIG. 3, which includes power supply time backward display lights 11081, 11082, 11083, 11084, 11085 and 11086, with each of the power supply time backward display lights 11081, 11082, 11083, 11084, 11085 and 11086 indicating a power supply time backward setting time and the light-on or light-off in any more than one of the power supply time backward display lights 11081, 11082, 11083, 11084, 11085 and 11086 representing the status change in the control of the central control module 1105.

In addition, the central control module 1105 can drive the relay 1104 to connect through by way of the relay driver circuit 1107 such that the electric power can be provided to the AC power source output module 114 and the AC power source output module 114 can output AC power to the load end 3. Upon pressing the power supply time backward selection control button 1110 and the power supply time forward selection control button 1111, it is possible to select the setting time for the intended power supply delay or advancement, and also pressing the power supply time backward selection control button 1110 and the power supply time forward selection control button 1111 can result in light-on or light-off changes in the power supply time backward display light set 1108 and the power supply time forward display light set 1109.

Figure 4:
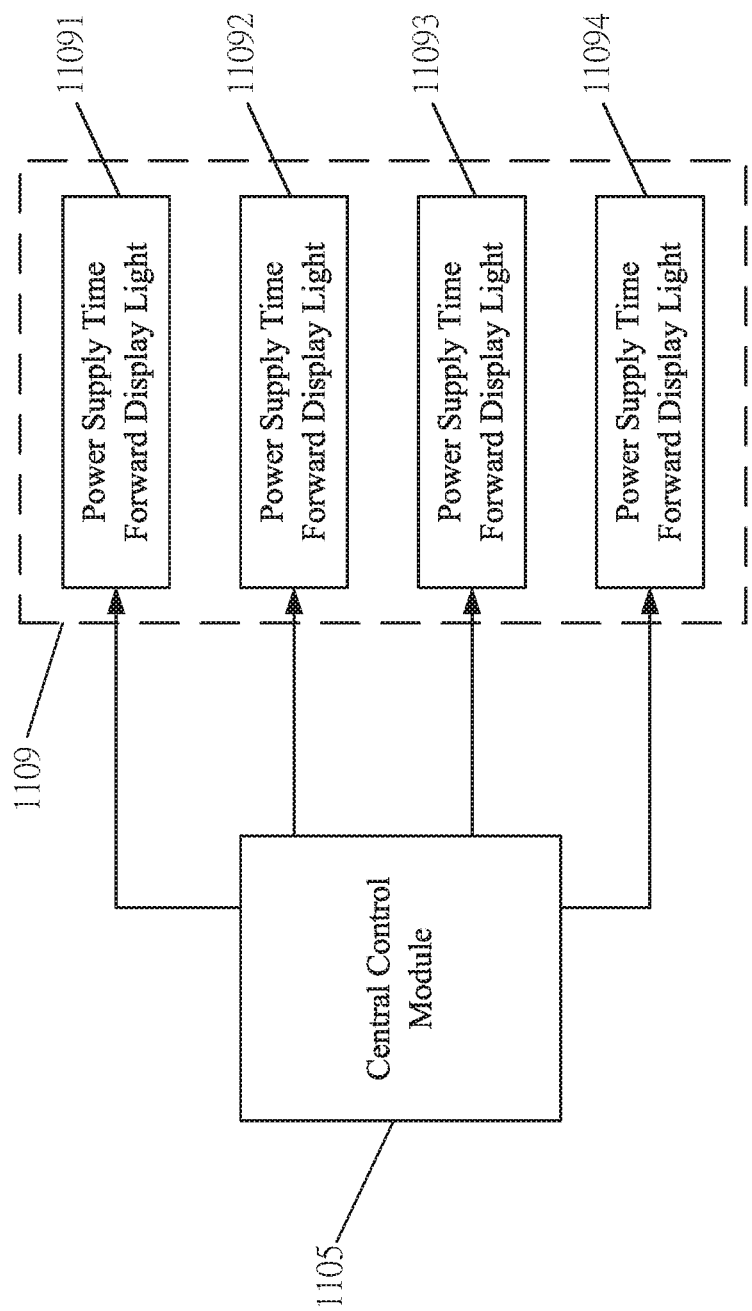
FIG. 4 shows a structure view of the power supply time forward display light set in the control device for power supply time of timers according to the present invention.

Similarly, as shown in FIG. 4, the power supply time forward display light set 1109 electrically connected to the central control module 1105 includes at least one power supply time forward display lights 11091, 11092, 11093 and 11094, with each of the power supply time forward display lights 11091, 11092, 11093 and 11094 indicating a power supply time forward setting time and the light-on or light-off in any more than one power supply time forward display lights 11091, 11092, 11093 and 11094 representing the status changes in the control of the central control module 1105.

In addition, the reset circuit 1112 is used to provide the reset signal upon repowering the central control module 1105.

The present invention is characterized in that the day/night detecting module 1106 detects first the sunset time of the current day and saves the detected sunset time; then in the next day, the central control module 1105 uses the saved sunset time of the previous day as the calculation base and employs the power supply time configured by the power supply time forward selection control button 1111 and the power supply time backward selection control button 1110 to calculate thereby activating the power supply at a setting time before the sunset time and a setting time after the sunset time. Moreover, when the day/night detecting module 1106 detects the sunrise time, indicating that the current day is over, the day/night detecting module 1106 continues to detect the sunset time of that day and uses the detected result as the calculation base for the advanced power supply time and delayed power supply time in the next day.

Herein, each time the power supply time backward selection control button 1110 is pressed, the next function will be selected. Suppose one of the functions is selected, the LED (i.e., the power supply time backward display light 11081, 11082, 11083, 11084, 11085 and 11086) corresponding to the selected function can be turned on in a cyclic fashion which may be like the power supply time backward display light 11081 (indicating power supply ON), the power supply time backward display light 11082 (indicating power supply DUSK), the power supply time backward display light 11083 (indicating power supply 1 H), the power supply time backward display light 11084 (indicating power supply 2 H), the power supply time backward display light 11085 (indicating power supply 4 H), the power supply time backward display light 11086 (indicating power supply 8 H) and then the power supply time backward display lights all turned off (indicating power supply OFF), and thus cycling repeatedly.

Furthermore, each time the power supply time forward selection control button 1111 is pressed, the next function will be selected. When one of the functions is selected, it will turn on the LED (i.e., the power supply time forward display light 11091, 11092, 11093 and 11094) of the selected function similarly in a cyclic approach which can be like the power supply time forward display light 11091 (indicating power supply of 30 MIN), the power supply time forward display light 11092 (indicating power supply of 60 MIN), the power supply time forward display light 11093 (indicating power supply of 90 MIN), the power supply time forward display light 11094 (indicating power supply of 120 MIN) and then the power supply time forward display lights all turned off (indicating power supply OFF, and thus cycling repeatedly.

More specifically, the power supply time backward display light 11081 being turned on indicates the power supply time is endless; the power supply time backward display light 11082 being turned on indicates the power supply time of the next day is the sunset time of the previous day and the power supply is deactivated at the sunrise time of the previous day; in addition, the power supply time backward display light 11083, 11084, 11085 and 11086 being turned on respectively indicates the power supply time starts at the sunset time delayed by 1 hour, 2 hours, 4 hours or 8 hours so as to output ON at the sunset time and then activate the countdown till the end of this backward time. Besides, if all of the power supply time backward display lights 11081, 11082, 11083, 11084, 11085 and 11086 are OFF, it indicates no power supply is performed.

On the other hand, the power supply time forward display light 11091, 11092, 11093 and 11094 being turned ON respectively indicates a forward power supply time of 30 minutes, 60 minutes, 90 minutes and 120 minutes; also, if all of the power supply time forward display light 11091, 11092, 11093 and 11094 are turned OFF, it means on power supply is performed.

Figure 6A:
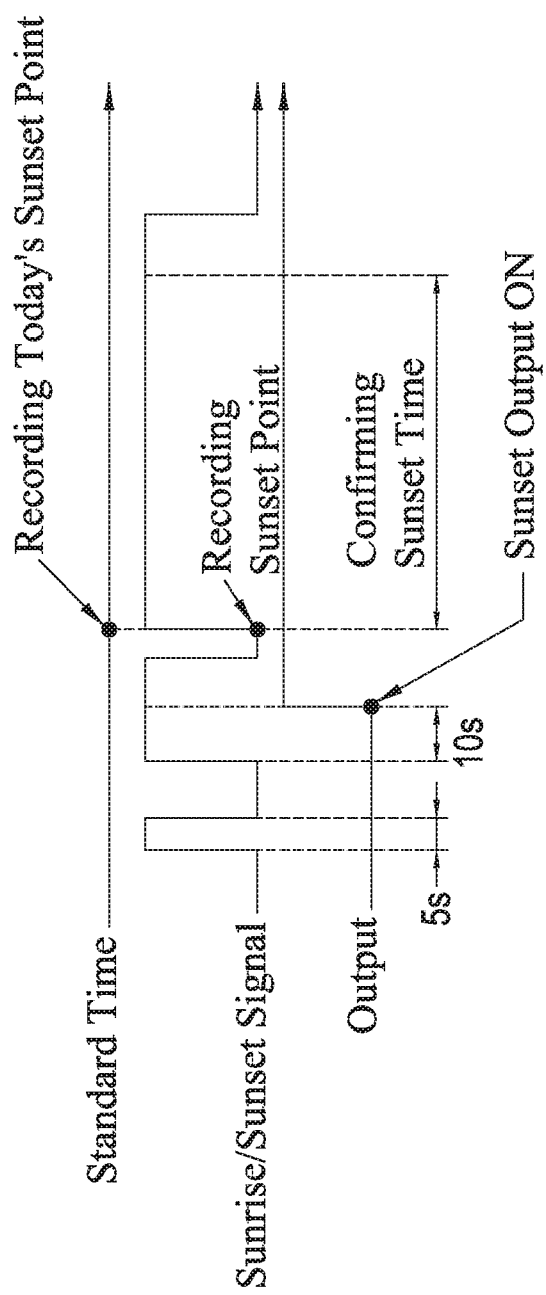
FIG. 6A shows a determination diagram in a first embodiment of the control device for power supply time of timers according to the present invention.

Next, a first embodiment of the present invention shown in FIG. 6A is provided, illustrated as below:

(1) when the power supply time backward display light set 1108 is configured to be 1 H/2 H/4 H/8 H and the function of the power supply time forward display light set 1109 is enabled, then, in the first day, the approach that the day/night detecting module 1106 determines the sunset is activating the output to be ON upon detecting the sunset for continuous 10 seconds;

(2) at this time, it needs to continuously detect the sunset time; suppose the detection of sunset is indeed confirmed, then the entry moment of this sunset time is recorded, wherein this operation of sunset time recording is performed once a day and this sunset time can be applied in the next day.

Figure 6B:
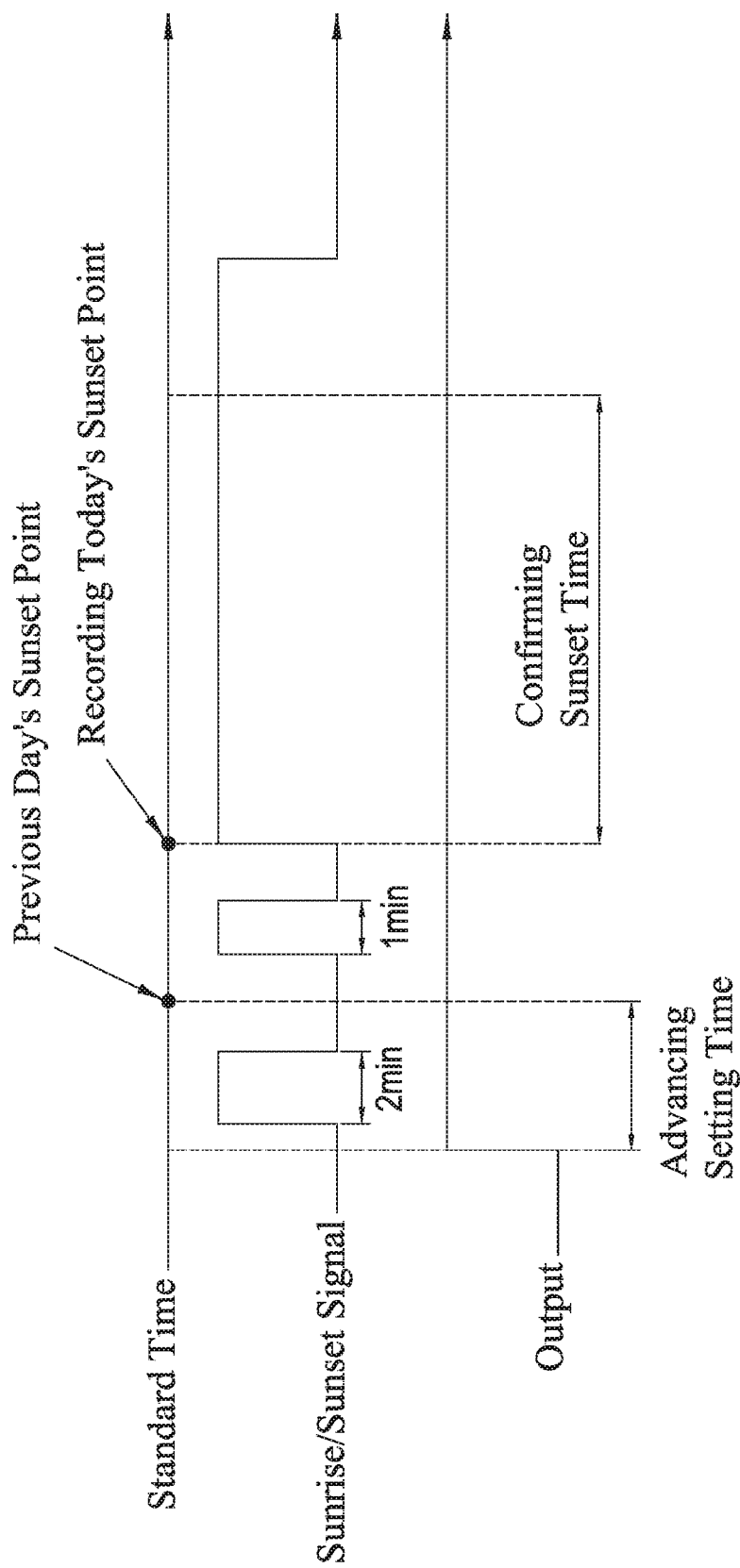
FIG. 6B shows a determination diagram in a second embodiment of the control device for power supply time of timers according to the present invention.

Subsequently, a second embodiment of the present invention shown in FIG. 6B is provided, illustrated as below:

(1) when the power supply time backward display light set 1108 is configured to be 1 H/2 H/4 H/8 H and the function of the power supply time forward display light set 1109 is enabled, then, after the second day, only when the determined sunset time is really confirmed as the sunset can the entry time to this sunset be recorded;

(2) the output action is based on the sunset time recorded in the previous day to accordingly configure the time of the power supply time forward display light set 1109 to the recorded sunset time of the previous day thereby advancing the time setting of the power supply time forward display light set 1109 for operations.

Furthermore, an illustration for the continuation from the second embodiment of the present invention shown in FIG. 6C is provided, whose method can be illustrated as below:

(1) assume the power supply time backward display light set 1108 is configured to be 1 hour and the power supply time forward display light set 1109 is 30 minutes;

(2) the sunset time recorded in the previous day is PM 5:30 and the sunrise time determined by detections in the second day is AM 6:30; while in the second day, since the sunset time recorded in the previous day is PM 5:30 and the configured forward time is 30 minutes, so the relay 1104 starts to output ON signal (i.e., indicating continuous power supply) at PM 5:00;

(3) furthermore, because the backward function is set to be 1 hour, the relay 1104 needs to continuously output until the time PM 6:30, by then it outputs OFF (i.e., indicating power supply deactivated);

(4) additionally, as the sunrise time of the second day is AM 6:30, only after this time, AM 6:30, can it start to determine and record the sunset time required to be registered in the second day for the operations of the third day.

Meanwhile, the central control module 1105 can record first the sunset time of the first day and determine whether the power supply time backward selection control button 1110 and the power supply time backward selection control button 1111 have been pressed; if yes, then, in the second day, the power supply time including the power supply activation and the power supply deactivation can be accordingly moved forward and/or backward based on the recorded sunset time. After such, it needs to further record the sunset time of the second day for controlling the power supply time to the load end 3 in the third day.

Figure 7A:
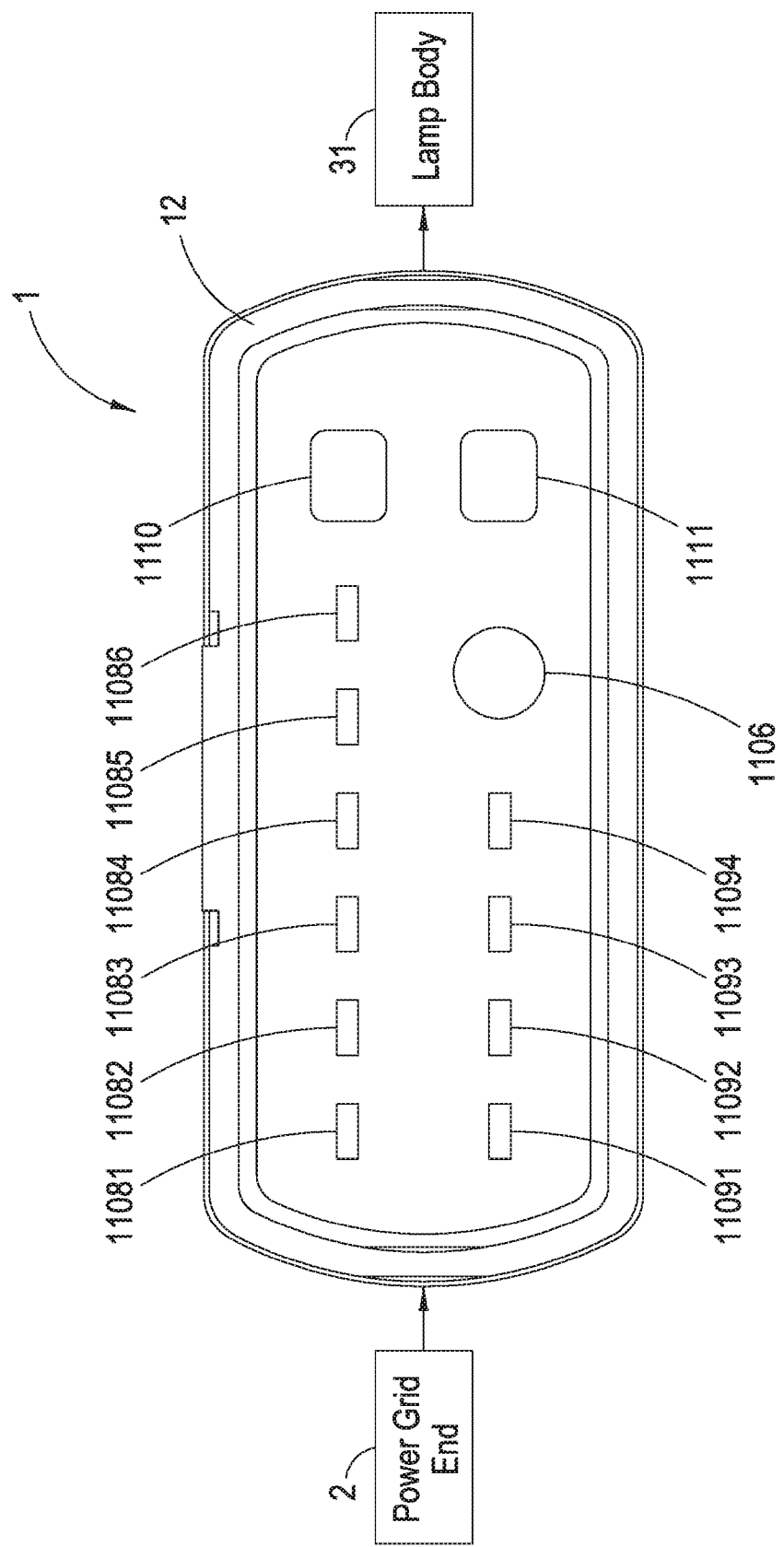
FIG. 7A shows an application structure view of the control device for power supply time of timers according to the present invention.
Figure 7B:
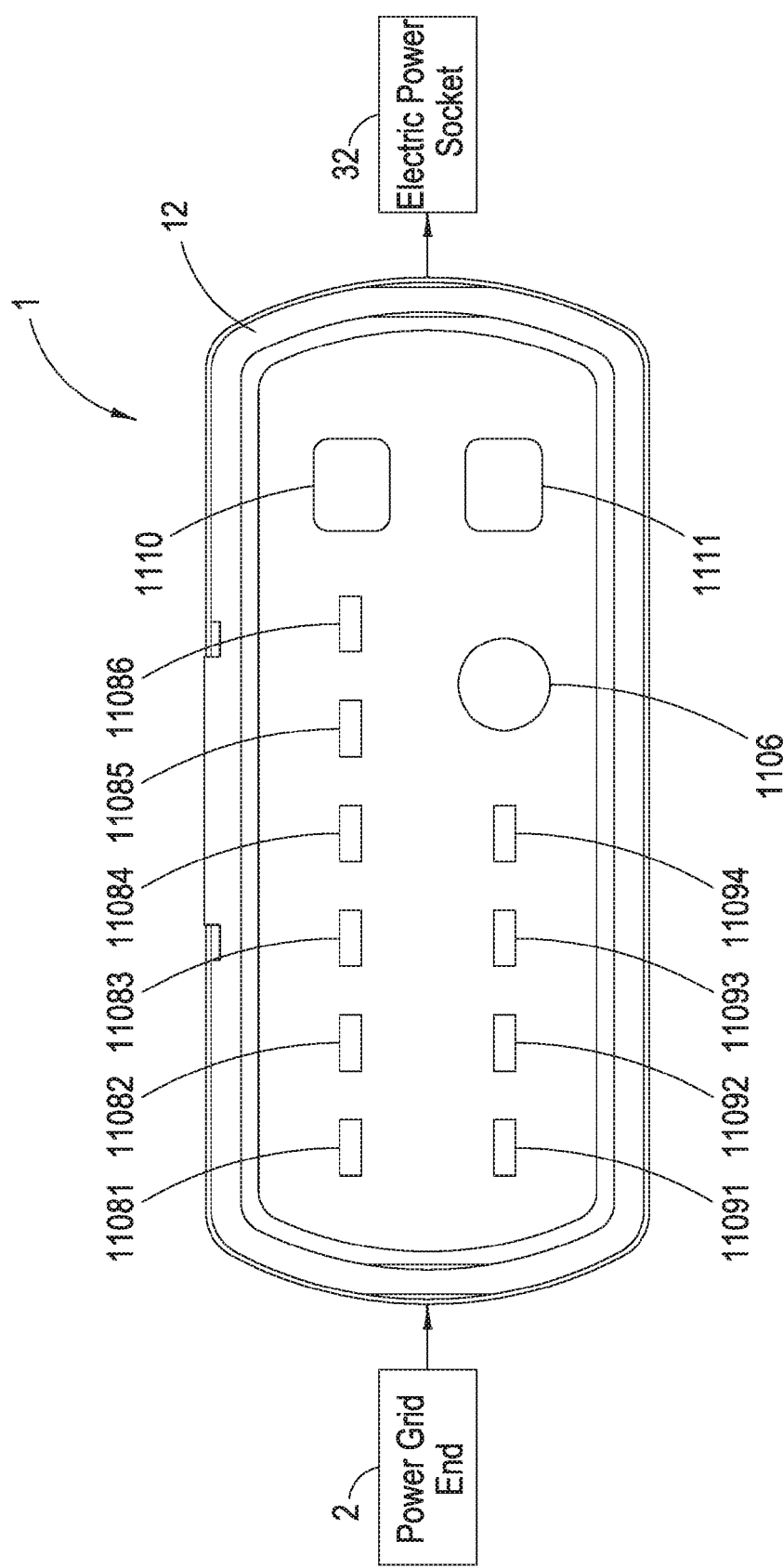
FIG. 7B shows an application structure view of the control device for power supply time of timers according to the present invention.

It should be noticed that the control device for power supply time of timers according to the present invention may be also applied to a variety of load ends 3; as shown in FIG. 7A, the load end may be a lamp body 31, and in case the control device for power supply time of timers 1 is electrically connected to the lamp body 31, it can control the switch on and off of the lamp body 31. However, in addition to the lamp body 31 depicted in FIG. 7A, the load end can be an electric power socket 32, as shown in FIG. 7B, so that the control device for power supply time of timers 1 can control the duration of power supply time enabled for the electric power socket 32.

In comparison with other conventional technologies, the control device for power supply time of timers according to the present invention provides the following advantages:

1. The present invention is able to prevent undesirable situations such as activating the power supply before sunset or deactivating the power supply after sunset.

2. The present invention is able to, based on the sunset time of the previous day as well as the configured power supply backward setting time or the power supply forward setting time, delay or advance the power supply time for the load end, and then record the sunset time of the next day thereby controlling the power supply time for the load end in the further next day.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A control device for power supply time of timers, which is electrically connected to a power grid end and at least a load end, wherein the control device for power supply time of timers comprises:

an alternative current (AC) power source input module, used to input AC power;

a direct current (DC) power source supply module, which is electrically connected to the AC power source input module and used to convert the AC power into the DC power;

an AC power source output module, which is electrically connected to a load end in order to output the AC power to the load end;

a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end;

a central control module, which is electrically connected to the DC power source supply module in order to control the integral operation mechanism of the control device for power supply time of timers;

a day/night detecting module, which is electrically connected to the central control module for detecting the sunrise and sunset conditions and transferring the signal indicating the sunrise and sunset conditions of each day to the central control module thereby allowing the central control module to determine and record the sunrise time and sunset time of each day;

a relay driver circuit, which is electrically connected to the central control module and the relay, in which the central control module is able to connect to the relay by means of the relay driver circuit such that electric power can be supplied to the AC power source output module;

a power supply time backward display light set, which includes at least one power supply time backward display light and is electrically connected to the central control module, wherein each of the power supply time backward display lights represents a power supply time backward setting time, and the light-on or light-off in any more than one power supply time backward display lights represents the status change in the control of the central control module;

a power supply time forward display light set, which includes at least one power supply time forward display light and is electrically connected to the central control module, wherein each of the power supply time forward display lights represents a power supply time forward setting time, and the light-on or light-off in any more than one power supply time forward display lights represents the status change in the control of the central control module;

a power supply time backward selection control button, which is electrically connected to the central control module, wherein the power supply time backward selection control button can be pressed to select power supply backward setting time, and, by pressing the power supply time backward selection control button, the power supply time backward display light can be turned on or off;

a power supply time forward selection control button, which is electrically connected to the central control module, wherein the power supply time forward selection control button can be pressed to select the power supply forward setting time, and, by pressing the power supply time forward selection control button, the power supply time forward display light can be turned on or off; and by pressing the power supply time backward selection control button or the power supply time forward selection control button, it turns on one of the power supply time backward display lights or the power supply time forward display lights such that the central control module can, based on the sunset time of the previous day as well as the configured power supply backward setting time or power supply forward setting time, postpone or advance the power supply time for the load end in the next day, and then record the sunset time of the next day so as to control the power supply time for the load end in the further next day.

2. The control device for power supply time of timers according to claim 1, further comprising the light-on in a power supply time backward display light to represent that the power supply time is endless.

3. The control device for power supply time of timers according to claim 1, further comprising the light-on in a power supply time backward display light to represent the power supply time of the next day is the sunset time of the previous day and to stop power supply at the sunrise time of the previous day.

4. The control device for power supply time of timers according to claim 1, further comprising the light-offs in all of the power supply time backward display lights to represent not postponing power supply.

5. The control device for power supply time of timers according to claim 1, wherein the power supply time backward display light can represent the postponed power supply time as being 1 hour, 2 hours, 4 hours or 8 hours.

6. The control device for power supply time of timers according to claim 1, further comprising the light-offs in all of the power supply time forward display lights to represent not advancing power supply.

7. The control device for power supply time of timers according to claim 1, wherein the power supply time forward display light can represent the advanced power supply time as being 30 minutes, 60 minutes, 90 minutes or 120 minutes.

8. The control device for power supply time of timers according to claim 1, further comprising a reset circuit electrically connected to the central control module, in which the reset circuit is, upon repowering, used to provide the central control module with the reset signal.

9. The control device for power supply time of timers according to claim 1, wherein after the day/night detecting module determines the sunrise condition of the next day and the central control module determines and records the sunrise time of the next day, then only after the sunrise time of the next day can the day/night detecting module start to determine and the central control module record the sunset time of the next day.

10. The control device for power supply time of timers according to claim 1, wherein the day/night detecting module includes at least an optical sensor.

* * * * *